Feb. 11, 1947. G. L. LARISON 2,415,596
VEHICLE DRIVE
Filed Nov. 28, 1944 6 Sheets-Sheet 1

INVENTOR
GLENN L. LARISON
by Geisler and Geisler
ATTORNEYS

Feb. 11, 1947.　　　　G. L. LARISON　　　　2,415,596
VEHICLE DRIVE
Filed Nov. 28, 1944　　　　6 Sheets-Sheet 3

INVENTOR
GLENN L. LARISON
by Feisler and Feisler
ATTORNEYS

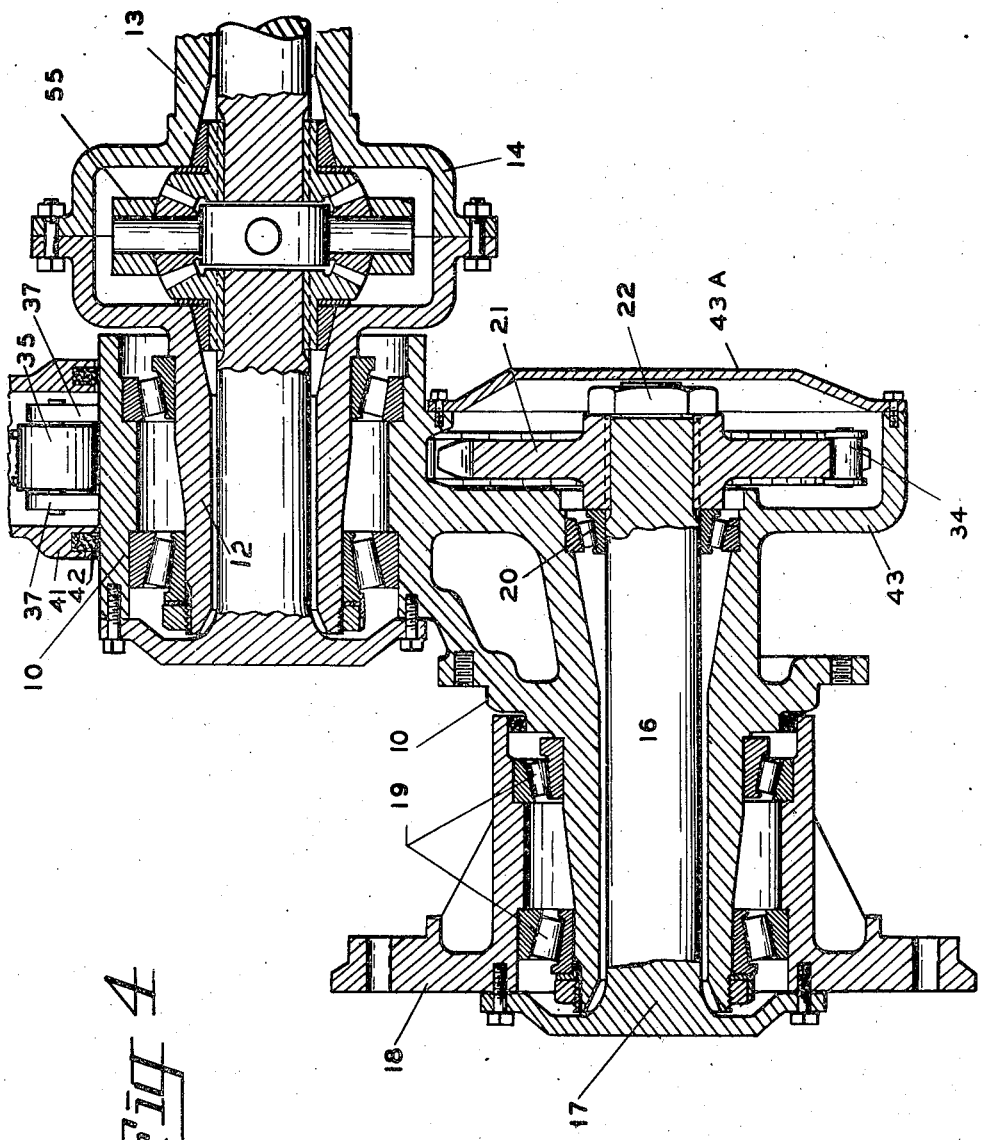

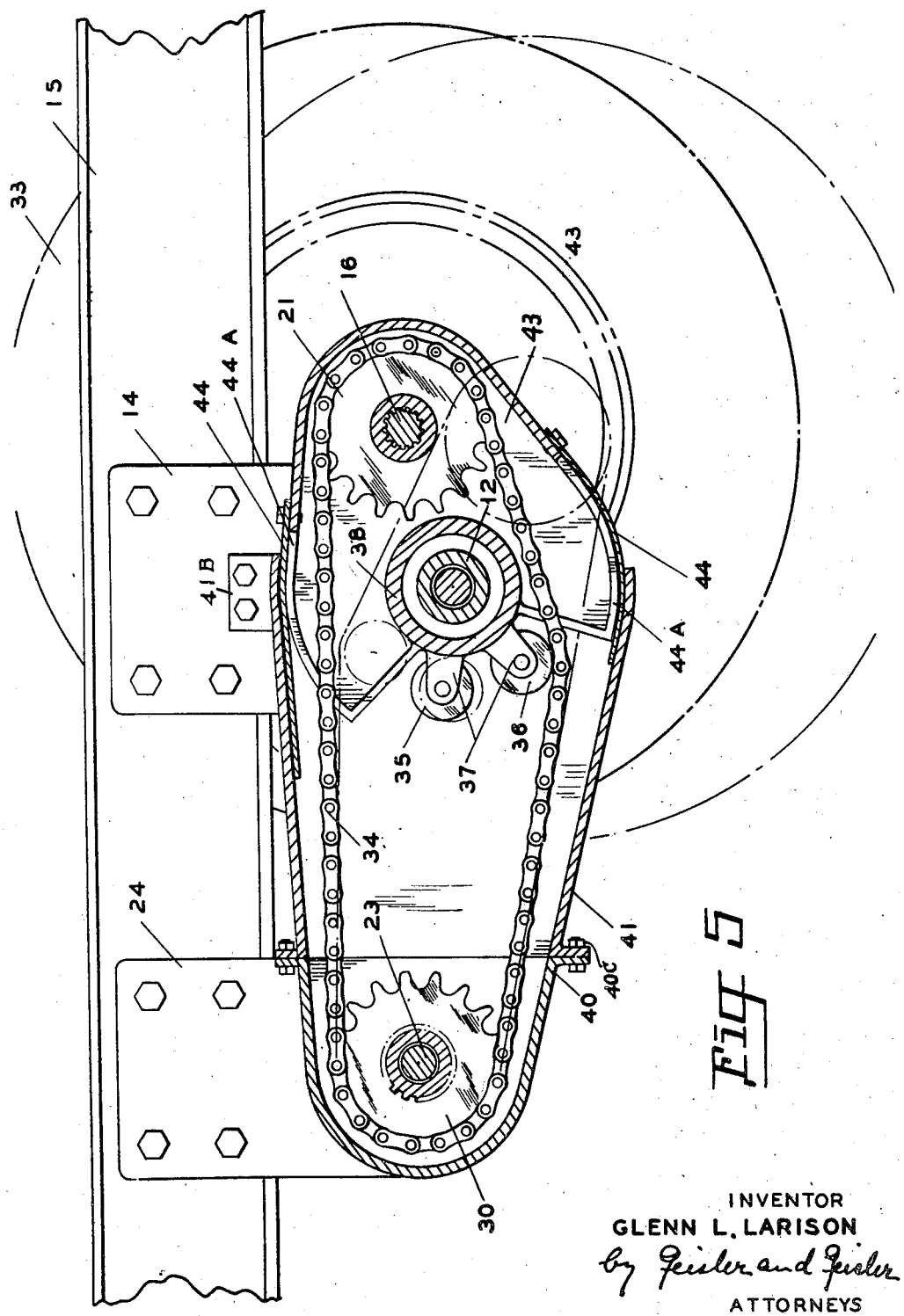

Feb. 11, 1947.   G. L. LARISON   2,415,596
VEHICLE DRIVE
Filed Nov. 28, 1944   6 Sheets-Sheet 6

INVENTOR.
GLENN L. LARISON
BY *Geisler and Geisler*
*Attorneys*

Patented Feb. 11, 1947

2,415,596

UNITED STATES PATENT OFFICE 2,415,596

VEHICLE DRIVE

Glenn L. Larison, La Grande, Oreg., assignor to Larison Compensating Axle Corporation, a corporation of Oregon Application November 28, 1944, Serial No. 565,487

10 Claims. (Cl. 180—22)

This invention is concerned with a multiple wheel drive for a vehicle in which the vehicle wheel suspension comprises wheels arranged in pairs, with each wheel of the pair so mounted that it may be raised above the other, and with both wheels moving in parallel planes spaced a constant distance apart and interconnected with compensating mechanism so that each wheel carries an equal share of the load under all normal operating conditions. Such a vehicle suspension is shown, for example, in my copending application, Serial No. 512,351, filed under date of November 30, 1943, and entitled "Vehicle suspension," to which reference will later be made. This application has been issued as Patent No. 2,401,766 on June 11, 1946.

More specifically this invention relates to means for driving the individual wheels, in a vehicle suspension of the type above indicated, either at slightly different speeds, when the vehicle is turning, or in unison, when the vehicle is moving ahead under normal conditions, and regardless of the raised or lowered position of the wheels, and the object of this invention is to provide a simple practical driving mechanism for this purpose.

An additional object of this invention is to provide a suitable housing for parts of the driving mechanism which will protect the driving mechanism from dust and dirt without interfering with the up and down movement of each wheel-carrying assembly.

Another object of this invention is to provide a driving mechanism for each wheel separately which will include a sprocket chain mounted to drive the wheel and suitable means for maintaining proper tension in such sprocket chain regardless of change of position of the wheel-carrying assembly in which the wheel is mounted.

Incidental objects and advantages of the present invention will appear from the following description in reference to the accompanying drawings.

In the drawings:

Fig. 4 is a fragmentary section corresponding to the line 4—4 of Fig. 2;

Fig. 5 is a sectional side elevation similar to Fig. 2 but showing the relative position of the movable portion of the housing which protects the drive mechanism and the position of the sprocket chain tensioning means when the wheel-carrying assembly is in raised position, as, for example, would occur when the wheel of the vehicle is caused to pass over a bump in the roadway;

Figure 1:
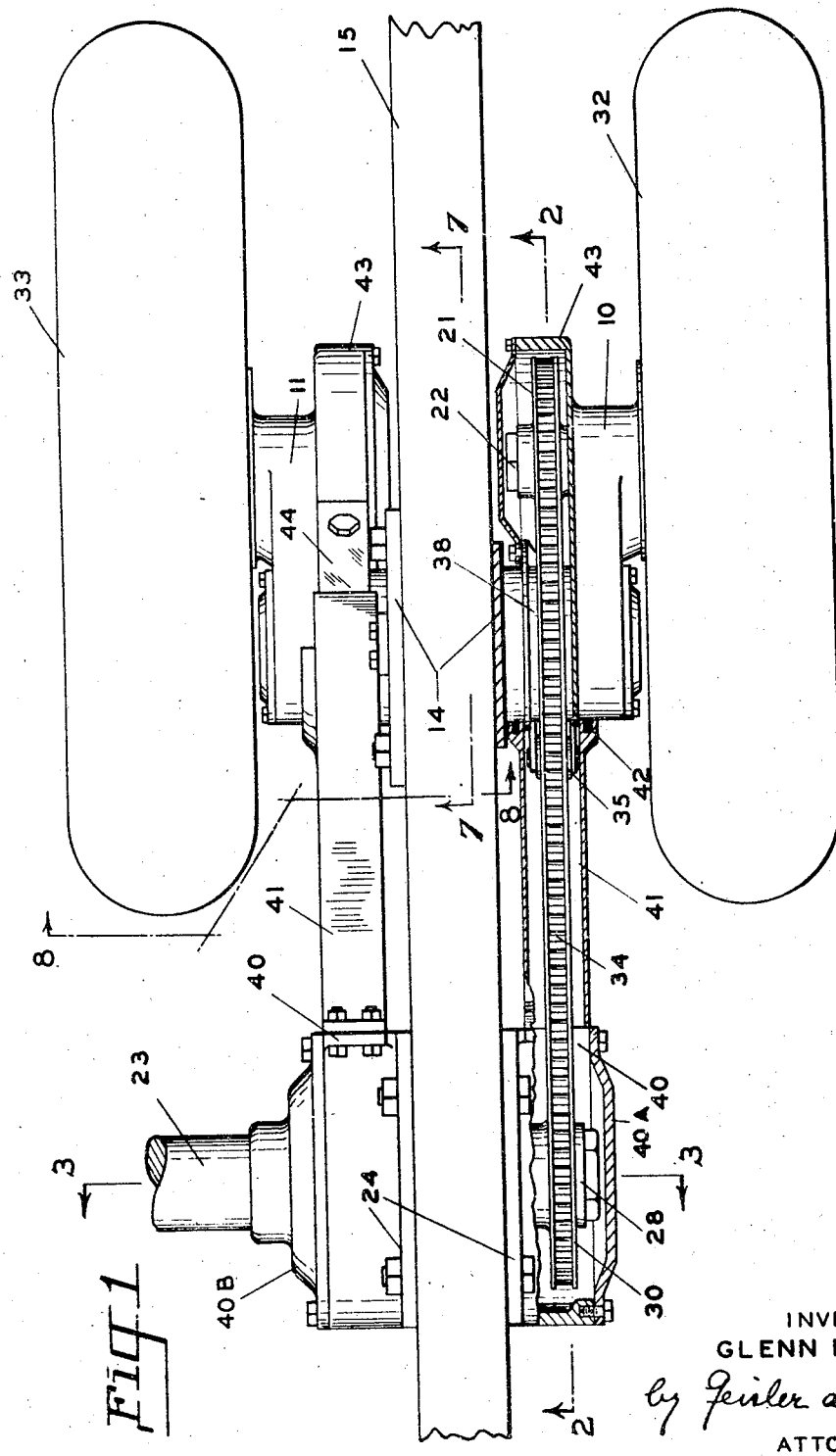
Fig. 1 is a fragmentary plan view of a pair of wheel assemblies and associated driving mechanism located at one side of the vehicle frame, the housing of the driving mechanism for the outside wheel being shown partly in section.

Referring first to Figs. 1 and 4, a pair of wheel-carrying assemblies 10 and 11 are journaled on elongated hub portions 12 and 13 (Fig. 4) of a compound supporting bracket 14 secured to the longitudinal frame member 15. The mounting of the wheel-carrying assemblies is assumed to be similar to that shown in Figs. 1 and 2 of my copending application, Serial No. 512,351 above mentioned, in which a description of such mounting will be found. As explained in said copending application, the two wheel-carrying assemblies, which move in parallel vertical planes, are connected to a differential mechanism supported in the compound bracket so that upward movement of one wheel-carrying assembly will exert a force normally tending to move the other wheel-carrying assembly in the opposite direction, but simultaneous upward movement relatively of both wheel-carrying assemblies will cause the differential mechanism to be rotated as a unit against the force of some suitable resilient or spring means.

A wheel drive axle 16 is rotatably carried in each wheel-carrying assembly. An end plate 17 at the outer end of each wheel drive axle, and preferably integral with it, is bolted to the wheel hub 18, as shown in Fig. 4. The wheel hub is journaled on the wheel-carrying assembly by the bearings 19 and the wheel drive axle is also journaled in the bearings 20. A driven sprocket 21 is splined to the inner end of each wheel drive axle and held against axial displacement by a suitable nut 22.

Figure 2:
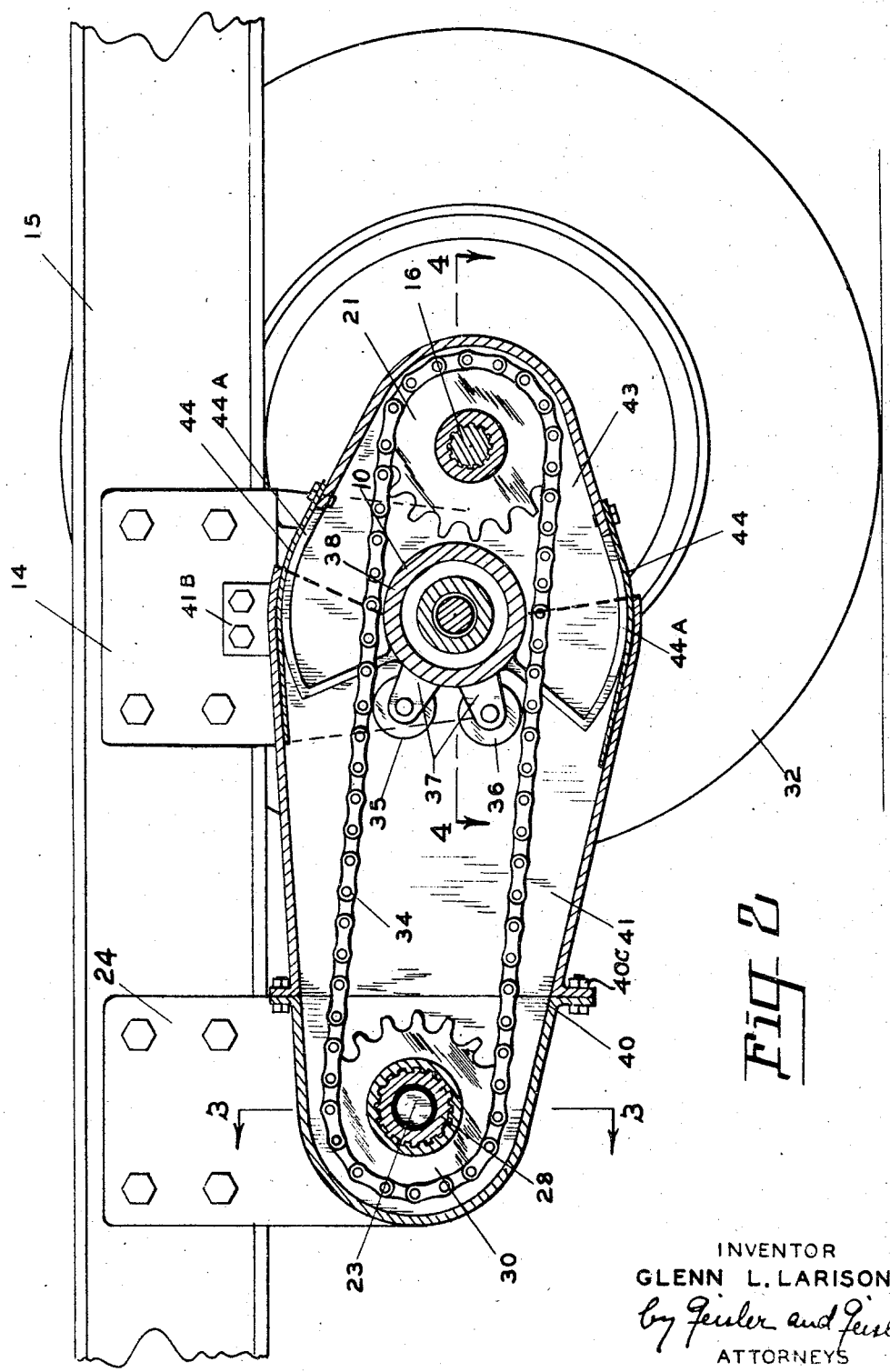
Fig. 2 is a sectional side elevation corresponding to the line 2—2 of Fig. 1.
Figure 3:
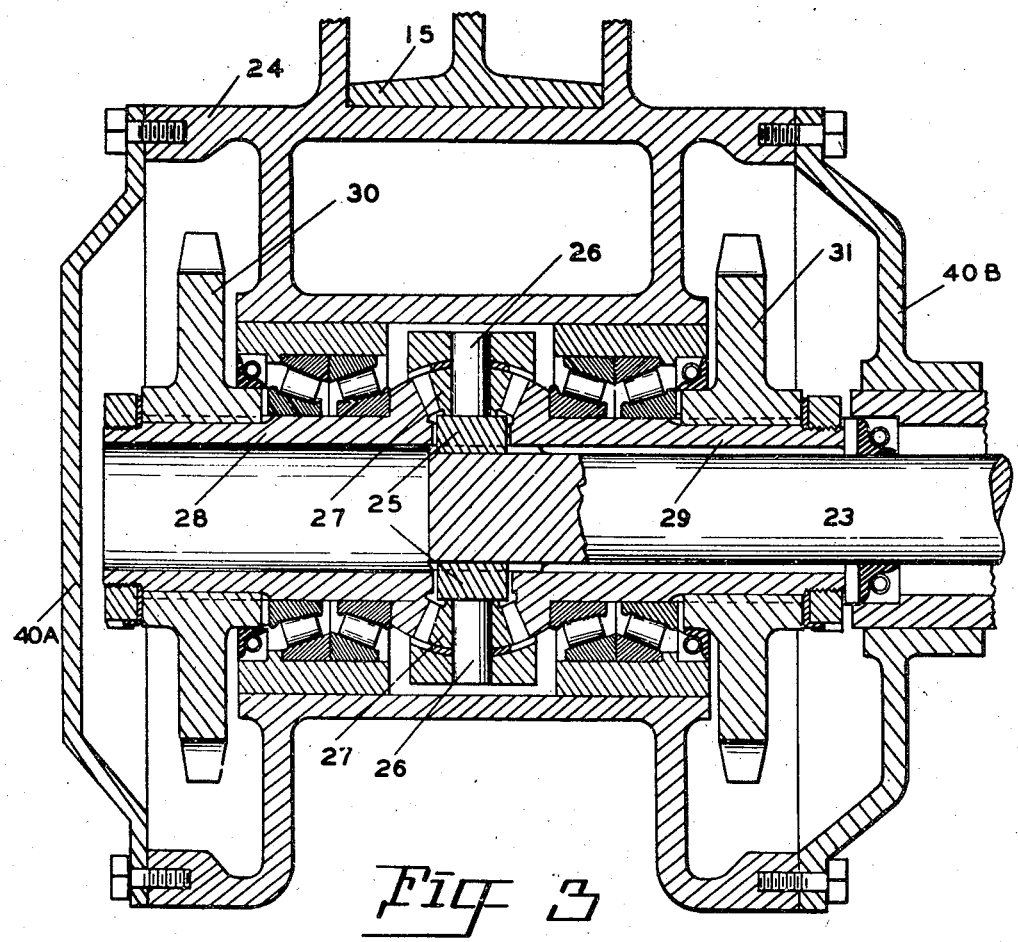
Fig. 3 is a fragmentary transverse vertical section on line 3—3 of Fig. 1, and also corresponding to the line 3—3 of Fig. 2.

Referring to Figs. 1, 2 and 3, a supplemental vehicle drive differential connected with the usual vehicle drive axle 23, is supported in a mounting bracket 24 secured to the longitudinal frame member 15. A central pinion support 25 is splined to the end of the drive axle 23, and on the stub shafts 26, extending therefrom, are rotatably mounted the pinions 27 which mesh with the side gears 28 and 29 to which the drive sprockets 30 and 31 respectively are splined. The drive sprockets 30 and 31 are connected by sprocket chains to the driven sprockets for the wheels 32 and 33 respectively, the drive sprocket 30, for example, being connected to the driven sprocket 21 (Fig. 2) by the sprocket chain 34. Thus the two wheels 32 and 33 may be driven in unison when the vehicle is moving straight ahead or one wheel may be driven slightly faster than the other when the vehicle is turning. The vehicle drive axle 23 is to be understood as being driven in the usual manner through the medium of the vehicle main drive differential (not shown). A similar supplemental differential (not shown) mounted on the opposite side of the vehicle and connected with the other half of the vehicle drive axle is connected in the same manner with the pair of wheels on the opposite side of the vehicle so that all four wheels may be driven at the same or different speeds through the medium of the main drive differential and the two supplementary drive differentials.

Since the wheel drive axles and the driven sprockets attached thereto are mounted in the wheel-carrying assemblies which may move up or down as previously explained, it is obvious from Fig. 2 that such movement of the wheel-carrying assemblies would cause undesirable slack to develop in the sprocket drive chains unless some means were provided for maintaining the proper tension in the chains under such conditions. In order to maintain the desirable tension, and also to prevent the sprocket chain from rubbing on the hub of the wheel-carrying assembly, I provide a pair of sprocket-chain-engaging rollers 35 and 36 for each wheel-carrying assembly. These rollers are each carried by a pair of arms 37 made integral with, or rigidly attached to, the hub of the wheel-carrying assembly in the location shown in Fig. 2. These arms extend radially from the hub axis and their length is so proportioned with respect to the distance of the axis of the driven sprocket 21 from the hub axis that the slack in the sprocket chains will be properly taken up by the rollers for any raised or lowered position of the wheel-carrying assembly within the limited range permitted by the mounting of the wheel-carrying assemblies and their compensating mechanism. In Fig. 2 the axes of the driven sprocket 21, hub 38, and drive sprocket 30, are in substantially the same plane, but in Fig. 5 I show, for purpose of illustration, the wheel-carrying assembly in extreme raised position and also, in broken lines, in extreme lowered position. Thus when one of the wheels is lifted from the roadway in passing over a rock or bump, causing the wheel-carrying assembly to be raised, the lower roller 36 will bear against the lower portion of the drive sprocket chain 34, as shown in Fig. 5, preventing any slack in the chain and keeping the lower half of the chain from contact with the surface of the hub 38 of the wheel-carrying assembly. Similarly when the wheel-carrying assembly drops below the normal position, which occurs when the wheel momentarily drops into a rut or depression, the upper roller 35, by bearing against the upper half of the sprocket chain 34, performs the same function.

It is very desirable that the sprocket chain, sprocket-chain-engaging rollers and the two sprocket wheels of each driving assembly, be protected from grit and dirt, especially if the vehicle is so designed for use over rough country and mountain roads. However, it is not possible to provide a rigidly mounted or stationary housing for these members, which will be a sufficient protection against dust and dirt, due to the fact that the wheel-carrying assembly does not remain in fixed position but may move up and down within certain limits. Therefore I have provided a specially constructed housing having a movable section supported on the wheel-carrying assembly which is so arranged as to form a protective enclosure regardless of the position of the wheel-carrying assembly, and which takes up a minimum of space and is simple in construction. This housing is shown in Figs. 1, 2, 5 and 8.

The forward section 40 of the housing is integral with the bracket 24, in which the supplemental drive differential is mounted, and extends part way about the drive sprocket 30 and includes a removable cap 40A so as to permit access to the drive sprocket 30 and associated parts of the supplemental drive differential. The corresponding cap 40B (Fig. 3) of the housing for the drive for the inside wheel 33 has a central boss and opening through which the drive axle and its tubular housing extend. In other respects the housings for the driving mechanisms for the two wheels of the pair are similar.

The middle section 41 of the housing is also stationary and is attached to the forward section 40 by bolts 40C extending through abutting flanges as shown in Fig. 2. This middle housing section 41 also has a flange 41B by which it is secured to the bracket 14. The side walls of the housing section 41 are formed with an arcuate cut-away portion at the rearward ends to enable the ends to fit part way around the hub 38 of the wheel-carrying assembly and are enlarged about the hub and provided with a suitable seal 42 in contact with the hub 38.

Figure 8:
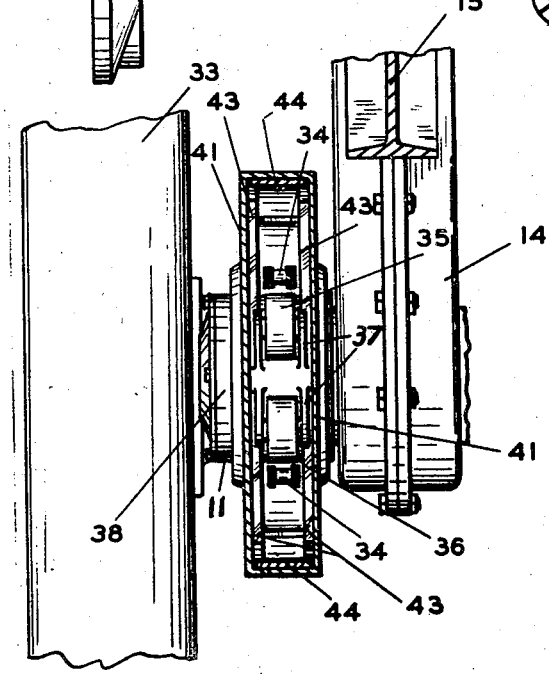
Fig. 8 is a fragmentary transverse section through the housing of the drive chain for the inside wheel of the pair, corresponding to line 8—8 of Fig. 1.

The rear section 43 of the housing is integral with the wheel-carrying assembly and therefore moves up and down with it. The side walls of this section are spaced slightly closer together so as to fit inside the side walls of the middle section 41 of the housing, as shown in Figs. 2 and 8, and have sliding contact therewith over a sufficient area to form a seal between the adjacent wall surfaces. The outer edges of the side walls of section 43 adjacent section 41 are arcuate in order to maintain such seal the entire distance to the top and bottom of section 41 during up and down movement of section 43. Portions 44A are cut out of the top and bottom walls of the housing section 43, as shown in Fig. 2, and these cut-out portions are covered by sealing strips of flexible spring metal 44, the rear ends of which are secured to the top and bottom walls of the housing section 43 and the forward ends of which bear against the inside faces of the top and bottom walls of housing section 41 so as to have a slidable sealing contact therewith at all times. The purpose of these cut-away portions and resilient sealing strips will be apparent from Fig. 5. When the wheel-carrying assembly is in raised or lowered position, as illustrated in Fig. 5, the cut-away portions of the housing section 43 allow ample clearance for the sprocket chain 34 while the resilient sealing strips 44, always resting against the inside of the top and bottom walls of the housing section 41, provide the necessary dust seal between these parts of the sections regardless of the position of the wheel-carrying assemblies. These resilient sealing strips 44 are preferably attached to the housing section 43 by removable bolts or screws so that they can easily be replaced should they become sufficiently worn to make their replacement desirable. The housing section 43 includes a removable cap 43A (Fig. 4) permitting convenient access to the driven sprocket 21 and the inner end of the wheel spindle 16.

Figure 6:
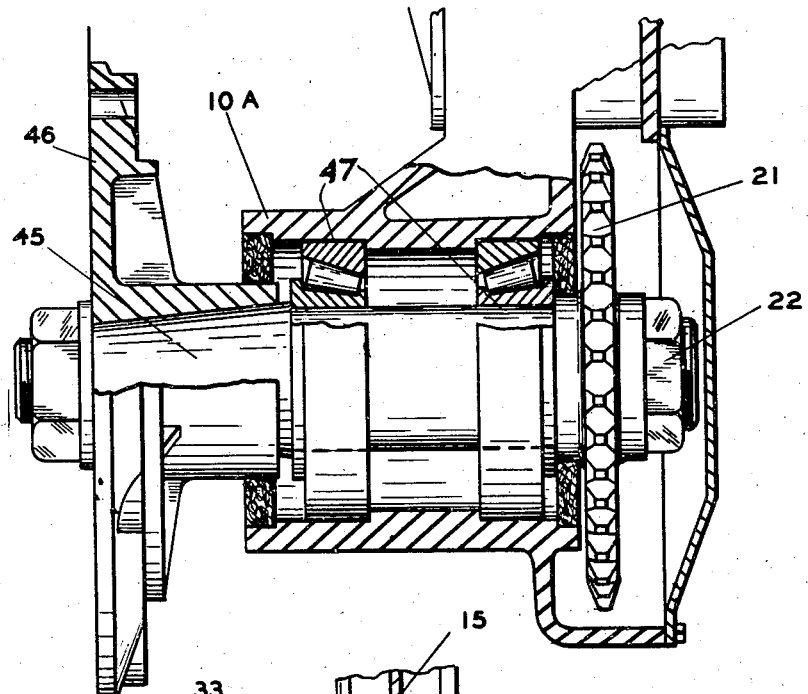
Fig. 6 is a fragmentary section similar in part to Fig. 4 but showing a modified mounting for the wheel drive axle in the wheel-carrying assembly.

In Fig. 6 I show a modified mounting for the wheel drive axle in the wheel-carrying assembly. In this construction the wheel hub 46 is supported entirely on the drive axle 45, and the drive axle is rotatably mounted in the slightly modified wheel-carrying assembly 10A by means of the bearings 47. The driven sprocket 21 is secured to the wheel drive axle as in the construction shown in Fig. 4 and previously described. Other modified forms of mounting for wheel drive axle and wheel hub might, of course, be provided in the wheel-carrying assembly.

Figure 7:
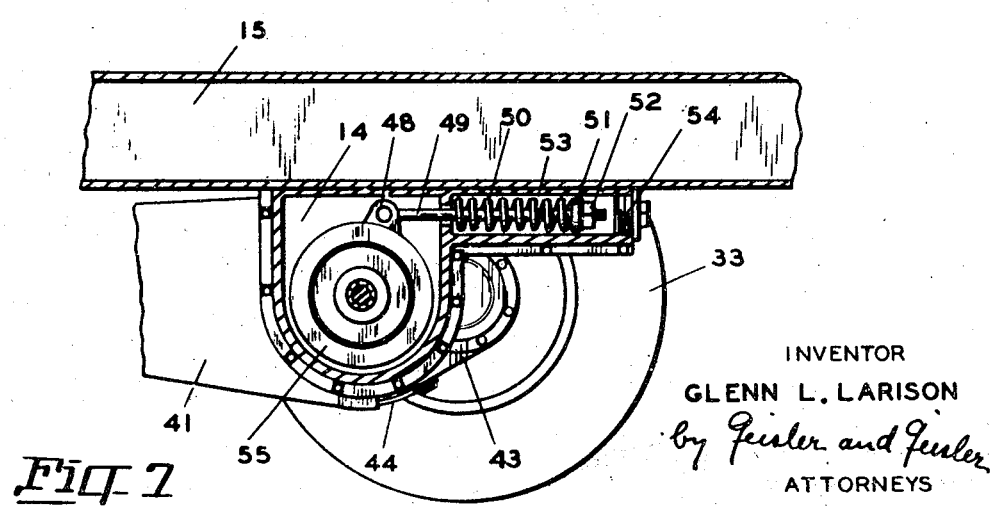
Fig. 7 is a side fragmentary sectional view taken through the differential mechanism of the wheel assembly on line 7—7 of Fig. 1.

In Fig. 7 I show a simple practical spring control for the differential or compensating mechanism interconnecting the pair of wheel-carrying assemblies functioning in the same manner as the construction illustrated in Fig. 1 of my copending application Serial No. 512,351. The differential spider-retaining ring 55 (see also Fig. 4) carries a lug or lever arm 48 at the top to which a tie rod 49 is pivotally connected. The rod 49 extends into the chamber 53 of the supporting bracket 14 and a compression spring 50 is carried on the rod 49 and compressibly held between the inner end wall of the chamber 53 and the washer 51 bearing against the adjustable nut 52 on the end of the rod 49. A closure cap 54 is provided at the outer end of the cylindrical chamber 53 to permit access to the nut 52 to enable the tension of the spring 50 to be adjusted. The function of the differential or compensating mechanism interconnecting the wheel-carrying assemblies has been more fully described in my copending application Serial No. 512,351 and need not be further explained.

I claim:

1. In a vehicle, a wheel-carrying assembly, said assembly hinged to a supporting member thereby permitting said assembly to move up and down in a substantially vertical plane, a wheel drive axle mounted in said assembly, a driven sprocket secured to said wheel drive axle, driving means mounted on the vehicle, a drive sprocket in said driving means, said drive sprocket located in the opposite direction from the assembly hinge from that in which said assembly extends, a sprocket chain connecting said drive and said driven sprockets, sprocket-chain-engaging means carried by said assembly and so placed as to engage the sprocket chain when the wheel drive axle is raised or lowered, a housing covering said drive sprocket and a portion of said sprocket chain, and a second housing mounted on said assembly and covering said driven sprocket, said second housing having sliding contact with said first mentioned housing whereby to form a seal between said housings.

2. In a vehicle, a wheel carrying assembly, said assembly hinged to a supporting member thereby permitting said assembly to move up and down in a substantially vertical plane, said assembly extending from the assembly hinge in a direction opposite to the normal line of travel of the vehicle, a wheel drive axle mounted in said assembly, a driven sprocket secured to said wheel drive axle, driving means mounted on the vehicle, a drive sprocket in said driving means, said drive sprocket located ahead of said assembly in the normal line of travel of the vehicle, a sprocket chain connecting said drive and said driven sprockets, a pair of sprocket-chain-engaging rollers carrier on the hinge portion of said assembly and so placed as to engage the sprocket chain respectively when the wheel drive axle is raised or lowered, each of said rollers supported on a pair of arms extending radially from said hinge portion, a stationary housing extending over said drive sprocket and the portion of said sprocket chain between said drive sprocket and said hinge portion, and a movable housing section mounted on said assembly and extending over said driven sprocket, said movable housing section having side walls extending inside the side walls of said stationary housing and forming a seal with said walls of the stationary housing.

3. In a vehicle, a pair of wheel-carrying assemblies, each of said assemblies hinged to a supporting member permitting said assemblies to move up and down in parallel planes spaced a constant distance apart, compensating means interconnecting said assemblies to cause each assembly normally to support an equal load, said assemblies extending in the same direction, a wheel drive axle mounted in each assembly, a driven member secured to each wheel drive axle, driving means mounted on the vehicle, a differential included in said driving means, a pair of drive members connected to said differential, said differential and drive members located in the opposite direction from the hinges of said assemblies from that in which said assemblies extend, means connecting said drive and said driven members respectively, engaging means associated with each assembly and engaging the respective connecting means when the wheel drive axle is raised or lowered.

4. In a vehicle, a pair of wheel-carrying assemblies, each of said assemblies having a hub portion hinged to a supporting member permitting said assemblies to move up and down in parallel planes spaced a constant distance apart, compensating means interconnecting said assemblies to cause each assembly normally to support an equal load, said assemblies extending from their respective hub portions in a direction opposite to the normal line of travel of the vehicle, a wheel drive axle mounted in each assembly, a driven sprocket secured to each wheel drive axle, driving means mounted on the vehicle, a differential included in said driving means, a pair of drive sprockets connected to said differential, said differential and drive sprockets located ahead of said assemblies, sprocket chains connecting said drive and said driven sprockets respectively, a pair of sprocket-chain-engaging rollers carried by each hub portion and so placed as to engage the sprocket chain respectively when the wheel drive axle is raised or lowered.

5. In a vehicle, a pair of wheel-carrying assemblies, each of said assemblies having a hub portion hinged to a supporting member permitting said assemblies to move up and down in parallel planes spaced a constant distance apart, compensating means interconnecting said assemblies to cause each assembly normally to support an equal load, said assemblies extending from their respective hub portions in a direction opposite to the normal line of travel of the vehicle, said hubs arranged in transverse axial alinement, a wheel drive axle mounted in each assembly, a driven sprocket secured to each wheel drive axle, driving means mounted on the vehicle, a differential included in said driving means, a pair of drive sprockets connected to said differential, said differential and drive sprockets located ahead of said assemblies, sprocket chains connecting said drive and said driven sprockets respectively, a pair of sprocket-chain-engaging rollers carried by each hub portion and so placed as to engage the sprocket chain respectively when the wheel drive axle is raised or lowered, each of said rollers supported on a pair of arms extending radially from said hub portion, a stationary housing extending over each drive sprocket and the portion of the sprocket chain between said drive sprocket and the corresponding assembly, and a movable housing section mounted on each assembly and extending over said driven sprocket.

6. A vehicle drive including a pair of wheel-carrying assemblies, each of said assemblies having a hub portion hinged to a supporting member permitting said assemblies to move up and down in parallel planes spaced a constant distance apart, compensating means interconnecting said assemblies to cause each assembly normally to support an equal load, said assemblies extending from their respective hub portions in a direction opposite to the normal line of travel of the vehicle, a wheel drive axle mounted in each assembly, a driven sprocket secured to each wheel drive axle, driving means mounted on the vehicle, a differential included in said driving means, a pair of drive sprockets connected to said differential, said differential and drive sprockets located ahead of said assemblies, sprocket chains connecting said drive and said driven sprockets respectively, a pair of sprocket-chain-engaging rollers carried by each assembly and so placed as to engage the sprocket chain respectively when the wheel drive axle is raised or lowered, each of said rollers supported on a pair of arms extending radially from said hub portion, whereby said wheel drive axles can be driven at the same or different speeds from said differential and said sprocket chains will be maintained in proper tension regardless of the relative positions of said assemblies.

7. In a vehicle, a pair of wheel-carrying assemblies, each of said assemblies having a hub portion hinged to a supporting member permitting said assemblies to move up and down in parallel planes spaced a constant distance apart, compensating means interconnecting said assemblies to cause each assembly normally to support an equal load, said assemblies extending in the same direction, a wheel drive axle mounted in each assembly, a driven sprocket secured to each wheel drive axle, driving means mounted on the vehicle, a differential included in said driving means, a pair of drive sprockets connected to said differential, said differential and drive sprockets located in the opposite direction from said hub portions to that in which said assemblies extend, sprocket chains connecting said drive and said driven sprockets respectively, a stationary housing extending over each drive sprocket and the portion of the sprocket chain between said drive sprocket and the corresponding hub, said stationary housing having side walls fitting around part of said hub, a movable housing section mounted on each assembly and extending over said driven sprocket, said movable housing sections having side walls extending inside the side walls of said stationary housing and forming a seal with said walls of the stationary housings respectively, said movable section having top and bottom walls with cut-away portions in said top and bottom walls adjacent said stationary housing, and sealing strips secured to said movable housings and extending over said cut-away portions.

8. In a vehicle, a pair of wheel-carrying assemblies, each of said assemblies having a hub portion hinged to a supporting member permitting said assemblies to move up and down in parallel planes spaced a constant distance apart, compensating means interconnecting said assemblies to cause each assembly normally to support an equal load, said assemblies extending in the same direction, a wheel drive axle mounted in each assembly, a driven sprocket secured to each wheel drive axle, driving means mounted on the vehicle, a differential included in said driving means, a pair of drive sprockets connected to said differenial, said differential and drive sprockets located in the opposite direction from said hub portions to that in which said assemblies extend, sprocket chains connecting said drive and said driven sprockets respectively, a stationary housing extending over each drive sprocket and the corresponding hub, said stationary housing having side walls fitting around part of said hub, a movable housing section mounted on each assembly and extending over said driven sprocket, said movable housing sections having side walls extending inside the side walls of said stationary housing and forming a seal with said walls of the stationary housings respectively, the outer edges of said side walls being arcuate to enable said seal to be maintained during movement of said movable section, said movable section having top and bottom walls with cut-away portions in said top and bottom walls adjacent said stationary housing, and resilient sealing strips removably secured to said movable housing and extending over said cut-away portions, said sealing strips having free end portions resting against the inside of the top and bottom of said stationary housing.

9. A vehicle drive including a pair of wheel-carrying assemblies, each of said assemblies having a hub portion hinged to a supporting member permitting said assemblies to move up and down in parallel planes spaced a constant distance apart, compensating means interconnecting said assemblies to cause each assembly normally to support an equal load, said assemblies extending from their respective hub portions in a direction opposite to the normal line of travel of the vehicle, said hubs arranged in transverse axial alinement, a wheel drive axle mounted in each assembly, a driven sprocket secured to each wheel drive axle, driving means mounted on the vehicle, a differential included in said driving means, a pair of drive sprockets connected to said differential, said differential and drive sprockets located ahead of said assemblies, sprocket chains connecting said drive and said driven sprockets respectively, a pair of sprocket-chain-engaging rollers carried by each hub portion and so placed as to engage the sprocket chain respectively when the wheel drive axle is raised or lowered, each of said rollers supported on a pair of arms extending radially from said hub portion, a stationary housing extending over each drive sprocket and the portion of the sprocket chain between said drive sprocket and the corresponding hub, said stationary housing having side walls fitting around part of said hub, a movable housing section mounted on each assembly and extending over said driven sprocket, said movable housing sections having side walls extending inside the side walls of said stationary housings and forming a seal with said walls of the stationary housings respectively, the outer edges of said side walls being arcuate to enable said seal to be maintained during movement of said movable section, said movable section having top and bottom walls with cut-away portions in said top and bottom walls adjacent said stationary housing, and resilient sealing strips removably secured to said movable housing and extending over said cut-away portions, said sealing strips having free end portions resting against the inside of the top and bottom of said stationary housing.

10. In a vehicle, a wheel-carrying assembly, said assembly having a hub portion hinged to a supporting member so as to permit said assembly to move up or down in a substantially vertical plane, said assembly extending from said hub portion rearwardly with respect to the normal direction of travel of the vehicle, a driven member mounted on said assembly to the rear of said hub portion, a driving member mounted on the vehicle ahead of said assembly, an endless connecting element connecting said driven member with said driving member, engaging means carried by said hub portion of said assembly and positioned ahead of said hub portion so as to move up or down in opposite direction with respect to the main portion of said assembly and said driven member, said means engaging said connecting element whenever said driven member is raised or lowered, thereby preventing excessive slack developing in said connecting element with the raising or lowering of said driven member.

GLENN L. LARISON.

REFERENCES CITED

The following references are of record in the file of this patent:

UNITED STATES PATENTS

| Number | Name | Date |
|---|---|---|
| 1,830,400 | Midboe | Nov. 3, 1931 |
| 1,902,712 | Leipert | Mar. 21, 1933 |
| 2,236,734 | Ronning | Apr. 1, 1941 |